United States Patent
Azulay et al.

(10) Patent No.: US 11,716,391 B2
(45) Date of Patent: Aug. 1, 2023

(54) ENCRYPTION OF PROXY SESSION ACTIVITY DATA USING USER-PROVIDED ENCRYPTION KEYS

(71) Applicant: Microsoft Technology Licensing, LLC, Redmond, WA (US)

(72) Inventors: Itamar Azulay, Mishmar Ayyalon (IL); Tomer Cherni, Ganei Tikva (IL)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 25 days.

(21) Appl. No.: 17/125,600

(22) Filed: Dec. 17, 2020

(65) Prior Publication Data
US 2022/0201084 A1 Jun. 23, 2022

(51) Int. Cl.
| | |
|---|---|
| H04L 67/14 | (2022.01) |
| H04L 9/32 | (2006.01) |
| H04L 9/08 | (2006.01) |
| H04L 9/06 | (2006.01) |
| H04L 9/14 | (2006.01) |
| H04L 67/561 | (2022.01) |

(52) U.S. Cl.
CPC ............... *H04L 67/14* (2013.01); *H04L 9/06* (2013.01); *H04L 9/0891* (2013.01); *H04L 9/0894* (2013.01); *H04L 9/14* (2013.01); *H04L 9/32* (2013.01); *H04L 67/561* (2022.05)

(58) Field of Classification Search
CPC ......... H04L 67/14; H04L 9/06; H04L 9/0891; H04L 9/0894; H04L 9/14; H04L 9/32; H04L 67/2804
See application file for complete search history.

(56) References Cited

U.S. PATENT DOCUMENTS

| | | | | |
|---|---|---|---|---|
| 7,146,505 B1* | 12/2006 | Harada | ............... | H04L 63/0471 726/13 |
| 7,165,175 B1* | 1/2007 | Kollmyer | ............. | H04N 7/1675 348/E7.056 |
| 7,308,477 B1* | 12/2007 | Gress | .................. | H04L 63/0428 379/279 |
| 8,954,740 B1* | 2/2015 | Moscaritolo | .......... | H04L 63/065 380/278 |
| 2006/0026286 A1* | 2/2006 | Lei | ........................ | H04L 67/142 709/227 |
| 2014/0122866 A1* | 5/2014 | Haeger | ............... | H04L 63/0471 713/153 |
| 2015/0113276 A1* | 4/2015 | Day | ...................... | H04L 9/0819 713/171 |
| 2019/0097791 A1* | 3/2019 | Hersans | ................ | G06F 12/123 |
| 2020/0026708 A1* | 1/2020 | Ahn | .................. | G06F 16/24575 |
| 2021/0111863 A1* | 4/2021 | Trivedi | .................... | G06N 3/04 |
| 2021/0234673 A1* | 7/2021 | Kurian | .................. | H04L 9/3213 |

* cited by examiner

*Primary Examiner* — Phyllis A Book
*Assistant Examiner* — Jihad K Boustany
(74) *Attorney, Agent, or Firm* — Mannava & Kang, P.C.

(57) ABSTRACT

According to examples, an apparatus may include a processor and a memory on which are stored machine-readable instructions that when executed by the processor, may cause the processor to obtain an encryption key from a user. The processor may identify session activity data during a proxy session of the user and may encrypt the identified session activity data using the encryption key obtained from the user. The processor may store the encrypted session activity data.

20 Claims, 4 Drawing Sheets

ENCRYPTION OF PROXY SESSION ACTIVITY DATA USING USER-PROVIDED ENCRYPTION KEYS

BACKGROUND

Proxy servers may generate session activity data during proxy sessions. The generated session activity data may include private data, which may be stored on the proxy servers.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
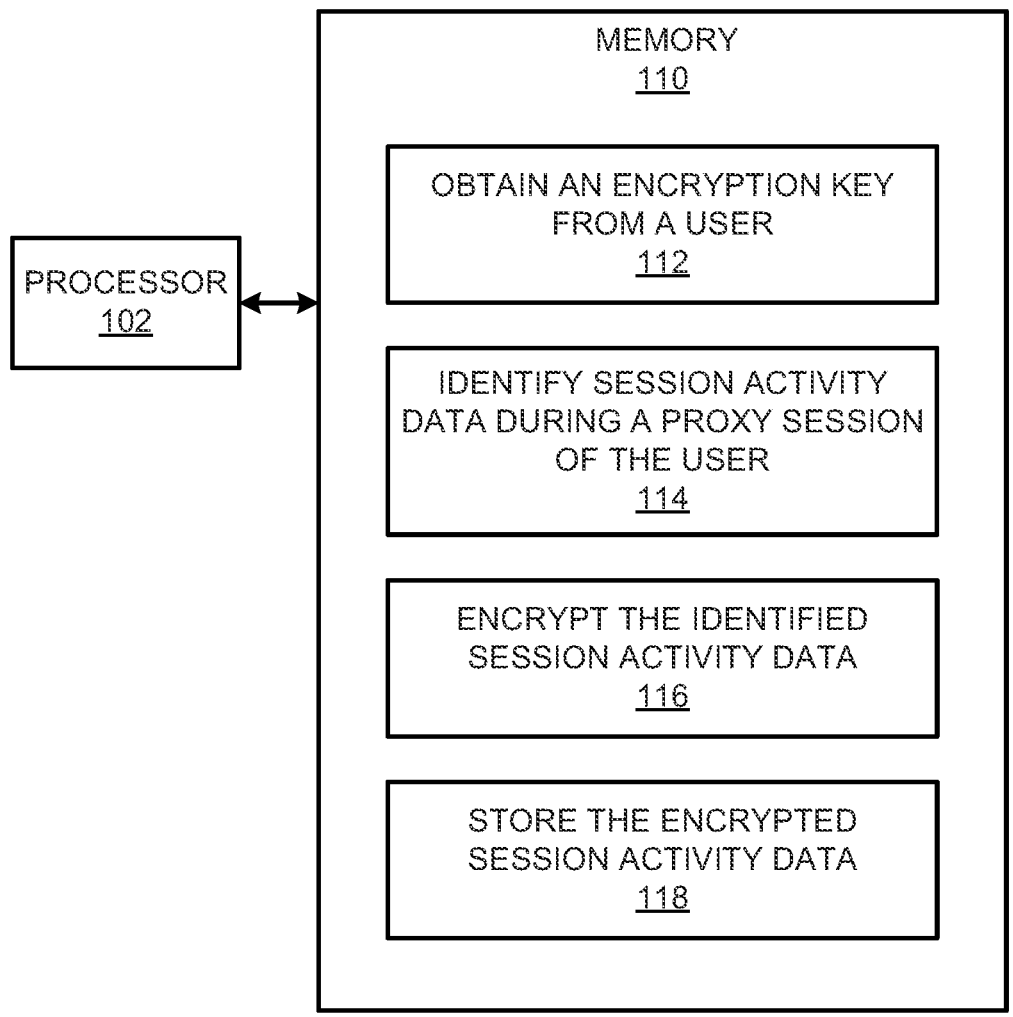
FIG. 1 depicts a block diagram of an apparatus that may encrypt session activity data during a proxy session of a user using an encryption key obtained from the user, in accordance with an embodiment of the present disclosure.

For simplicity and illustrative purposes, the principles of the present disclosure are described by referring mainly to embodiments and examples thereof. In the following description, numerous specific details are set forth in order to provide an understanding of the embodiments and examples. It will be apparent, however, to one of ordinary skill in the art, that the embodiments and examples may be practiced without limitation to these specific details. In some instances, well known methods and/or structures have not been described in detail so as not to unnecessarily obscure the description of the embodiments and examples. Furthermore, the embodiments and examples may be used together in various combinations.

Throughout the present disclosure, the terms "a" and "an" are intended to denote at least one of a particular element. As used herein, the term "includes" means includes but not limited to, the term "including" means including but not limited to. The term "based on" means based at least in part on.

A proxy server may be disposed between a client device and a server, and may be implemented to provide a proxy session to act as an intermediary for requests from clients to the server. During the proxy session, the proxy server may generate session activity data associated with events that may have occurred during the proxy session. The proxy server may also store the generated session activity data on the proxy server for access by an entity, such as an administrator of the proxy server or network on which the proxy server may operate. A technical concern associated with proxy sessions may be that the session activity data may include private data associated with users of the proxy sessions, which may cause security concerns if accessed by malevolent actors.

Proxy servers that provide the proxy sessions may be construed as man-in-the-middle systems (MitM systems). As a result, the private data may be exposed to third parties that provide the proxy sessions. In some instances, the private data may be encrypted for added protection, but in these instances, the encryption keys are typically owned by the MitM systems, which may pose risks to the private data, such as persistent storage of the private data on the third party servers.

Disclosed herein are apparatuses, systems, methods, and computer-readable media that may enable secure management of session activity data generated during proxy sessions. In some examples, an apparatus, e.g., a proxy server, may allow a client to encrypt session activity data using the client's own encryption key. As discussed herein, a processor may obtain an encryption key from a user. The processor may also identify session activity data during a proxy session of the user and may encrypt the identified session activity data using the encryption key obtained from the user. The processor may store the encrypted session activity data such that the encrypted session activity data, including any private data, may be accessible only using the user's encryption key. In some examples, the processor may receive instructions from the user to replace and/or purge the encryption key, which may render inaccessible any previously stored session activity data associated with that encryption key. In this manner, the processor may improve privacy of the client's private data, for instance, by preventing persistent storage of the client's private data on the proxy server.

Through implementation of the features of the present disclosure, a processor, e.g., of an apparatus such as a proxy server, may enable improved security and control of users' private data stored on the proxy server. By enabling users to use their own encryption keys, the processor may ensure the users that their private data may be stored without exposure to third parties, e.g., the proxy server. In some examples, the processor may prevent persistent storage of the private data by enabling the user to replace and/or purge their encryption keys, thereby preventing unauthorized access to the stored private data. In some examples, the processor may identify private data among the session activity data and may encrypt the identified private data among the session activity data, which may reduce a load on the processor to encrypt the session activity data. A technical improvement afforded through implementation of the features of the present disclosure may thus be that data, e.g., private session activity data, may be stored in a relatively more secure manner. As a result, the security of client devices as well as network security may be improved through implementation of the features of the present disclosure.

Figure 2:
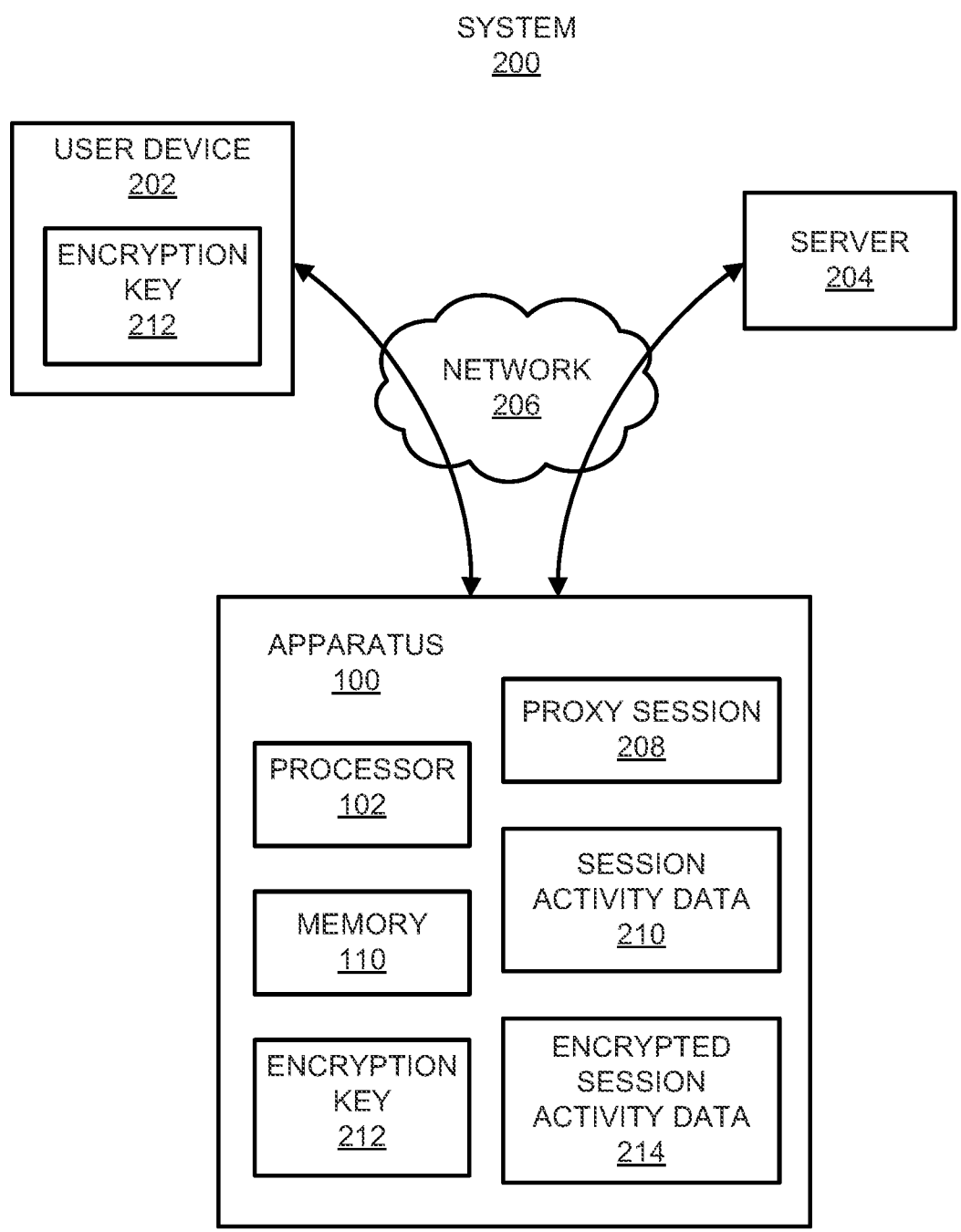
FIG. 2 shows a block diagram of a system within which the apparatus depicted in FIG. 1 may be implemented, in accordance with an embodiment of the present disclosure.

Reference is first made to FIGS. 1 and 2. FIG. 1 shows a block diagram of an apparatus 100 that may encrypt session activity data during a proxy session of a user using an encryption key obtained from the user, in accordance with an embodiment of the present disclosure. FIG. 2 shows a block diagram of an example system 200 that may include the apparatus 100 depicted in FIG. 1, in accordance with an embodiment of the present disclosure. It should be understood that the apparatus 100 depicted in FIG. 1 and/or the system 200 depicted in FIG. 2 may include additional features and that some of the features described herein may be removed and/or modified without departing from the scopes of the apparatus 100 and/or the system 200.

The apparatus 100 may include a processor 102 and a memory 110. The apparatus 100 may be a computing device, including a server, a node in a network (such as a data center), a desktop computer, a laptop computer, a tablet computer, a smartphone, an electronic device such as Internet of Things (IoT) device, and/or the like. The processor 102 may include a semiconductor-based microprocessor, a central processing unit (CPU), an application-specific integrated circuit (ASIC), a field-programmable gate array (FPGA), and/or other hardware device. In some examples, the apparatus 100 may include multiple processors and/or cores without departing from a scope of the apparatus. In this regard, references to a single processor as well as to a single memory may be understood to additionally or alternatively pertain to multiple processors and multiple memories.

The memory 110 may be an electronic, magnetic, optical, or other physical storage device that contains or stores executable instructions. The memory 110 may be, for example, Read Only Memory (ROM), flash memory, solid state drive, Random Access memory (RAM), an Electrically Erasable Programmable Read-Only Memory (EEPROM), a storage device, an optical disc, or the like. The memory 110 may be a non-transitory computer-readable medium. The term "non-transitory" does not encompass transitory propagating signals.

As shown in FIG. 1, the processor 102 may execute instructions 112-118 to encrypt session activity data during a proxy session of a user using an encryption key obtained from the user. The instructions 112-118 may be machine-readable instructions, e.g., non-transitory computer-readable instructions. In other examples, the apparatus 100 may include hardware logic blocks or a combination of instructions and hardware logic blocks to implement or execute functions corresponding to the instructions 112-118.

The apparatus 100 may be disposed between a user device 202 and a server 204. The user device 202 and the server 204 may communicate with via a network 206, which may be the Internet, a local area network, and/or the like. The apparatus 100 may act as a proxy for the user device 202 and may facilitate and/or enable a proxy session 208 for a user on the user device 202 to securely access data and/or services from the server 204. In addition to providing access to data and/or services from the server 204, the processor 102 may generate session activity data 210 associated with the proxy session 208. The session activity data 210 may include any information pertaining to activities that the user performed during the sessions, such as, websites visited, documents accessed, information inputted, information downloaded, timestamps corresponding to the times at which data was accessed, and/or the like.

The processor 102 may fetch, decode, and execute the instructions 112 to obtain an encryption key 212 from the user. The encryption key 212 may be any suitable type of secret key that may be unique to the user. In some examples, the processor 102 may provide a user interface (UI) for the user to access and manage the proxy session 208. In these examples, the processor 102 may cause the UI to be displayed at the user device 202 and the user may input and/or upload information, e.g., the encryption key 212, into the UI. The processor 102 may The processor 102 may authenticate the user through information obtained from the user via the UI. For instance, the user may log into the apparatus 100 via the UI using their credentials, such as a user identification/password, and/or the like. The processor 102 may authenticate the user and may determine a privilege level of the user. That is, the user may have any of a number of different privileges, such as an administrator level having administrative privileges, a user/participant level of the proxy session 208, and/or the like. Based on the user being authentic and/or having sufficient privileges, the processor 102 may obtain the encryption key 212 from the user. In some examples, the processor 102 may allow the encryption key 212 to be uploaded through the UI. The processor 102 may associate the user with the user-provided encryption key 212. The processor 102 may store the encryption key 212 in a key vault (not shown) provided in the apparatus 100. In some examples, the processor 102 may distribute the encryption key 212 to multiple geographically distributed nodes, which may prevent delays in communication/access from different the nodes.

The processor 102 may fetch, decode, and execute the instructions 114 to identify the session activity data 210 during the proxy session 208 of the user. By way of particular example and for purposes of illustration, the processor 102 may implement the proxy session 208 to enable the user to have secure access to the data/services at the server 204. In some examples, the user device 202 may include a browser interface to enable the user to access the proxy session 208. The processor 102 may control user access based on predetermined privileges, and may prevent sensitive data/documents from exiting a browser sandbox, for instance, by preventing printing and/or downloading documents to the user device 202.

During the proxy session 208, the processor 102 may generate the session activity data 210 associated with the proxy session 208. The session activity data 210 may be meta data including information associated with the session activity. By way of particular example and for purposes of illustration, the processor 102 may detect an unauthorized access attempt to a file on the server 204 by a user at the user device 202. In this example, the processor 102 may prevent access to the file and may generate the session activity data 210 associated with this event, which may include meta data about the unauthorized access attempt such as a date/time, a filename, a user name, user device 202 address, and/or the like.

In some examples, the processor 102 may identify private data (or private information) among the session activity data 210. The private data may be associated with predetermined fields identified as being private in the session activity data 210. For instance, a user may designate a particular field among a plurality of fields as being private, such as, a user name field, a user social security number filed, a password field, and/or the like. In this instance, the processor 102 may identify the data stored in these fields as being private data among the session activity data 210.

The processor 102 may fetch, decode, and execute the instructions 116 to encrypt the identified session activity data 210 to generate the encrypted session activity data 214 using the encryption key 212 obtained from the user. In some examples, the processor 102 may identify the private data among the session activity data 210 and may encrypt the identified private data, without encrypting session activity data that is not identified as being private data.

The processor 102 may fetch, decode, and execute the instructions 118 to store the encrypted session activity data 214. The processor 102 may associate the encrypted session activity data 214 with the encryption key 212 received from the user. That is, for instance, the processor 102 may enable access to the encrypted session activity data 214 only by the user that is associated with the encryption key 212.

In some examples, the processor 102 may receive a request from the user to access the encrypted session activity data 214. The user may be a user having privileges to manage the proxy session 208, for instance, to view the encrypted session activity data 214. The processor 102 may determine that the user is authorized to access the encrypted session activity data 214 based on the user being identified as being associated with the encryption key 212. For instance, the processor 102 may authenticate the user based on user credentials, such as user identification and password, or the like, input at the UI.

Based on the user being authenticated, the processor 102 may allow the authenticated user access to manage the session activity data 210. The processor 102 may determine whether the encryption key 212 associated with the user is available and, based on a determination that the encryption key 212 is available, the processor 102 may decrypt the encrypted session activity data 214 using the encryption key 212 used to encrypt the encrypted session activity data 214. The processor 102 may also cause the decrypted session activity data 210 to be displayed on the UI.

In some examples, the encryption key 212 may be based on a symmetric-key algorithm. In these examples, the encryption key 212 used to encrypt the session activity data 210 may be used to decrypt the encrypted session activity data 214.

In some examples, the processor 102 may obtain a second encryption key from the user. The second encryption key may be a new or updated encryption key as may be used to enhance security. The processor 102 may replace the encryption key 212 with the second encryption key. In this instance, the encrypted session activity data 214 encrypted using the replaced encryption key 212 may be inaccessible after the encryption key 212 is replaced. In other examples, the processor 102 may revalidate the encryption key 212, to allow continued access to associated encrypted session activity data 214, purge or revoke the encryption key 212, which may prevent future access to the encrypted session activity data 214, update the encryption key 212, for instance to add additional users associated with the encryption key 212, and/or the like.

Figure 3:
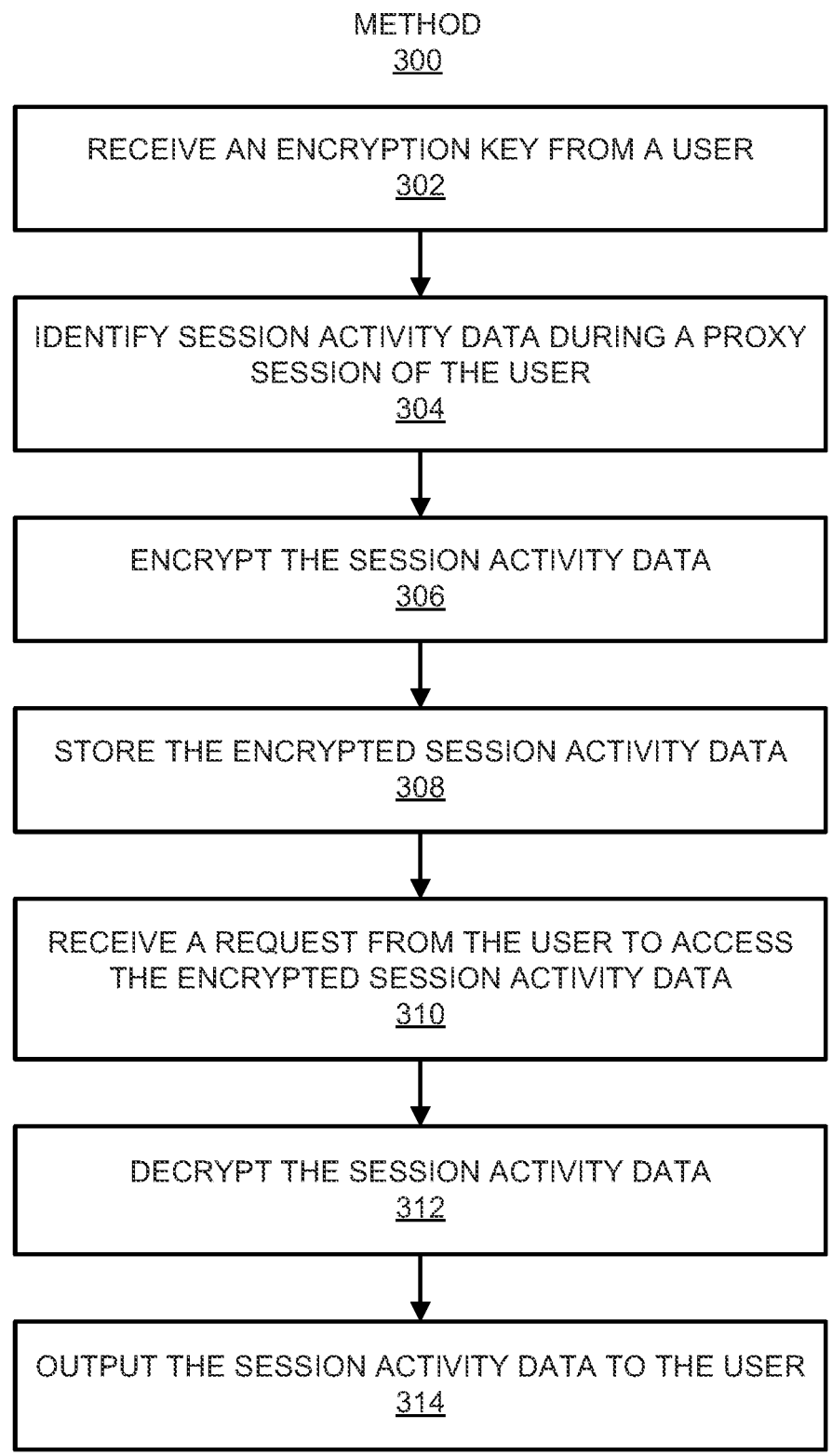
FIG. 3 shows a flow diagram of a method for encrypting session activity data during a proxy session of a user using an encryption key received from the user and decrypting the encrypted session activity data using the encryption key received from the user, in accordance with an embodiment of the present disclosure.

Various manners in which a processor 102 implemented on the apparatus 100 may operate are discussed in greater detail with respect to the method 300 depicted in FIG. 3. FIG. 3 depicts a flow diagram of a method 300 for encrypting session activity data 210 during a proxy session 208 of a user using an encryption key 212 received from the user and decrypting the encrypted session activity data 214 using the encryption key 212 received from the user, in accordance with an embodiment of the present disclosure. It should be understood that the method 300 depicted in FIG. 3 may include additional operations and that some of the operations described therein may be removed and/or modified without departing from the scope of the method 300. The description of the method 300 is made with reference to the features depicted in FIGS. 1 and 2 for purposes of illustration.

At block 302, the processor 102 may receive the encryption key 212 from a user. The user may upload the encryption key 212 to the apparatus 100 through a UI displayed at a user device 202. In other examples, the user may upload the encryption 212 in other manners. In addition, the processor 102 may store the encryption key 212 in a key vault, e.g., a secure key storage location on the apparatus 100. The processor 102 may also or additionally store the encryption key 212 across multiple nodes.

At block 304, the processor 102 may identify session activity data 210 during a proxy session 208 of the user. For instance, the processor 102 may generate the session activity data 210 during management of the proxy session 208 for the user. The processor 102 may generate the session activity data 210 by, for instance, generating event log information in response to denying the user access to certain data/services. The generated session activity data 210 may be meta data including private information associated with the user.

In some examples, the processor 102 may identify private data among the session activity data 210 using predetermined fields designated by the user as being private. For instance, the processor 102 may identify fields of data in the session activity data 210 designated as being private, and may identify data in the private fields as being private data.

At block 306, the processor 102 may encrypt the session activity data 210 using the encryption key 212 received from the user. In some examples, instead of encrypting the entire session activity data 210, the processor 102 may encrypt private information identified in the session activity data 210. In these examples, the processor 102 may encrypt the identified private data without encrypting session activity data that is not identified as being private data. At block 308, the processor 102 may store the encrypted session activity data 214, for instance, in a data store (not shown).

At block 310, the processor 102 may receive a request from the user to access the encrypted session activity data 214. At block 312, based on the user being authenticated, the processor 102 may decrypt the encrypted session activity data 214 using the encryption key 212 received from the user. The processor 102 may use the encryption key 212 used to encrypt the session activity data 210 to decrypt the encrypted session activity data 214. In this regard, the encryption key 212 may be based on a symmetric-key algorithm. At block 314, the processor 102 may output the decrypted session activity data 210 to the user.

In some examples, the processor 102 may determine that the user is authorized to access the encrypted session activity data 214 based on the user being identified as being associated with the encryption key 212. In some examples, the processor 102 may determine that the user has the encryption key 212 associated with the user's account, and based on a determination that the encryption key 212 is available, the processor 102 may decrypt the encrypted session activity data 214 using the encryption key 212. The processor 102 may cause the session activity data 210 to be displayed on the UI, communicate the session activity data 210 to the user device 202, and/or the like.

In some examples, the processor 102 may obtain a second encryption key from the user. In response to receipt of the second encryption key, the processor 102 may replace the encryption key 212 with the second encryption key. In this instance, the session activity data 210 that is encrypted using the replaced encryption key 212 may be inaccessible after the encryption key 212 is replaced, and subsequent session activity data 210 may be accessible using the second encryption key. In some examples, the processor 102 may purge or revoke the encryption key 212 to ensure that corresponding encrypted session activity data 214 is no longer accessible, revalidate the encryption key 212 to enable continued use of the encryption key 212, update the association for the encryption key 212 to allow different users to be associated with the encryption key 212, and/or the like.

Some or all of the operations set forth in the method 300 may be included as utilities, programs, or subprograms, in any desired computer accessible medium. In addition, the method 300 may be embodied by computer programs, which may exist in a variety of forms both active and inactive. For example, they may exist as machine-readable instructions, including source code, object code, executable code or other formats. Any of the above may be embodied on a non-transitory computer-readable storage medium.

Examples of non-transitory computer-readable storage media include computer system RAM, ROM, EPROM, EEPROM, and magnetic or optical disks or tapes. It is therefore to be understood that any electronic device capable of executing the above-described functions may perform those functions enumerated above.

Figure 4:
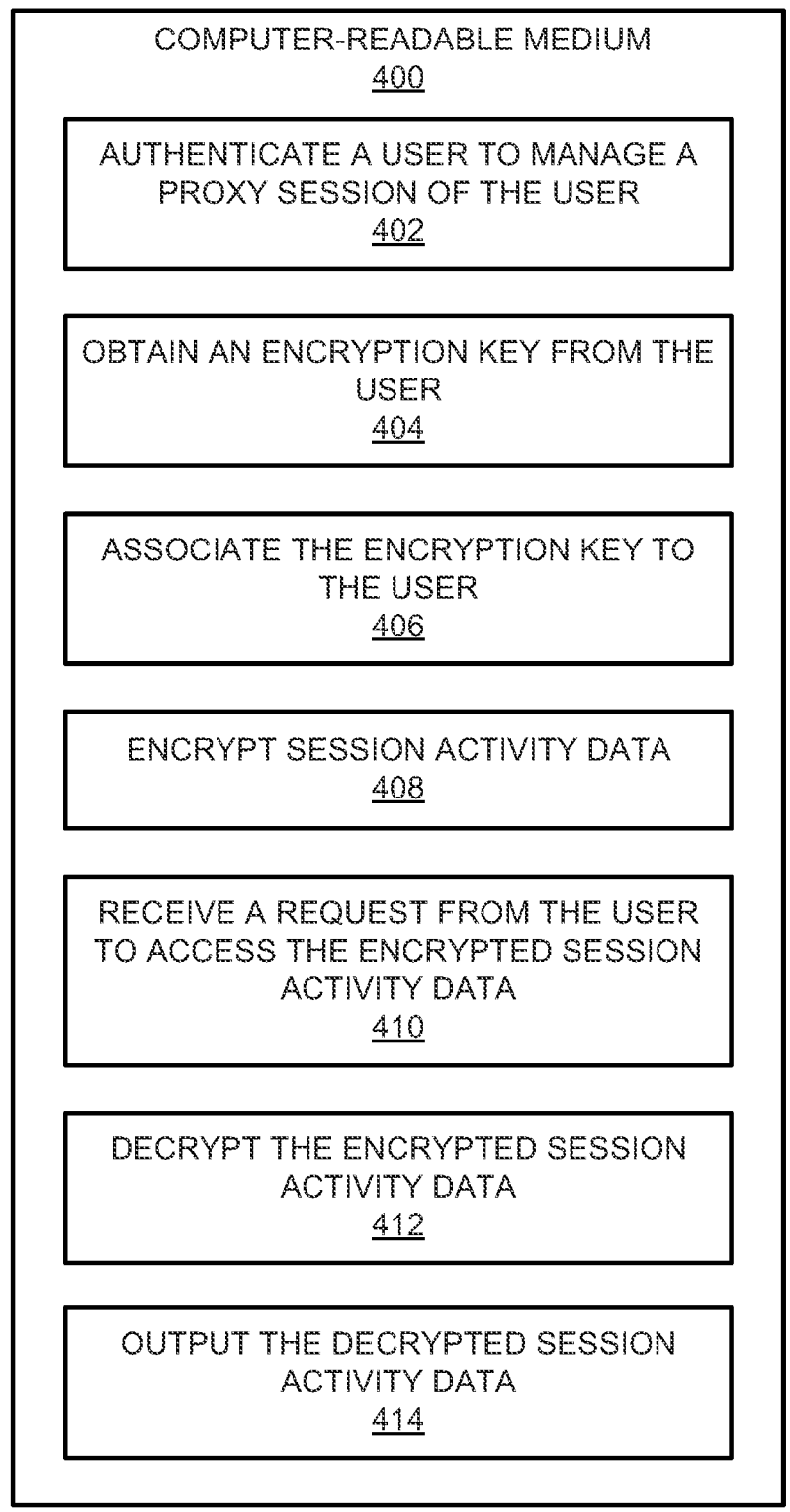
FIG. 4 depicts a block diagram of a computer-readable medium that may have stored thereon computer-readable instructions to authenticate a user to manage a proxy server and decrypt an encrypted session activity data using an encryption key associated with the user, in accordance with an embodiment of the present disclosure.

Turning now to FIG. 4, there is shown a block diagram of a computer-readable medium 400 that may have stored thereon computer-readable instructions to authenticate a user to manage a proxy server and decrypt an encrypted session activity data using an encryption key associated with the user, in accordance with an embodiment of the present disclosure. It should be understood that the computer-readable medium 400 depicted in FIG. 4 may include additional instructions and that some of the instructions described herein may be removed and/or modified without departing from the scope of the computer-readable medium 400 disclosed herein. The description of the computer-readable medium 400 is made with reference to the features depicted in FIGS. 1 and 2 for purposes of illustration. The computer-readable medium 400 may be a non-transitory computer-readable medium. The term "non-transitory" does not encompass transitory propagating signals.

The computer-readable medium 400 may have stored thereon machine-readable instructions 402-414 that a processor disposed in an apparatus 100 may execute. The computer-readable medium 400 may be an electronic, magnetic, optical, or other physical storage device that contains or stores executable instructions. The computer-readable medium 700 may be, for example, Random Access memory (RAM), an Electrically Erasable Programmable Read-Only Memory (EEPROM), a storage device, an optical disc, and the like.

The processor may fetch, decode, and execute the instructions 402 to authenticate a user to manage a proxy session 208 of the user. The processor may provide a UI to enable the user to log in to manage the proxy session 208.

Based on the user being authentic, the processor may fetch, decode, and execute the instructions 404 to obtain an encryption key 212 from the user. The processor may fetch, decode, and execute the instructions 406 to associate the encryption key 212 to the user. The processor may fetch, decode, and execute the instructions 408 to encrypt session activity data 214 of the proxy session 208 using the encryption key 212 associated with the user.

The processor may fetch, decode, and execute the instructions 410 to receive a request from the user to access the encrypted session activity data 214. In some examples, the processor may authenticate the user to confirm that the request to access the encrypted session activity data 214 is received from an authentic user.

The processor may fetch, decode, and execute the instructions 412 to decrypt the encrypted session activity data 214 using the encryption key 212 associated with the user. In some examples, the encryption key 212 may be based on a symmetric-key algorithm. The processor may fetch, decode, and execute the instructions 414 to output the decrypted session activity data to the user.

In some examples, the processor may obtain a second encryption key from the user, and in response to receipt of the second encryption key, the processor may replace the encryption key 212 with the second encryption key. In this regard, the encrypted session activity data 214 encrypted using the replaced encryption key 212 may be inaccessible after the encryption key 212 is replaced.

In some examples, to encrypt the identified session activity data 210, the processor may identify private data among the session activity data 210. The private data may be associated with predetermined fields identified as being private in the session activity data. The processor may encrypt the identified private data without encrypting session activity data that is not identified as being private data.

In some examples, to encrypt the identified session activity data 210, the processor may generate the session activity data 210 during management of the proxy session 208, identify private information in the generated session activity data 210, and encrypt the private information identified in the generated session activity data 210. In some examples, the generated session activity data 210 may be meta data including the private information.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration and are not meant as limitations. Many variations are possible within the scope of the disclosure, which is intended to be defined by the following claims— and their equivalents—in which all terms are meant in their broadest reasonable sense unless otherwise indicated.

What is claimed is:

1. An apparatus comprising:
a processor; and
a memory on which is stored machine-readable instructions that when executed by the processor, cause the processor to:
establish, via a proxy service at the apparatus, a proxy session between a client device and a server, the proxy session comprising session data based on communication between the client device and the server;
obtain an encryption key from the client device;
generate session activity data based on the session data during the proxy session, the session activity data including meta data that includes information pertaining to activities performed by the client device during the proxy session between the client device and the server;
identify private data among the meta data, the private data being associated with predetermined fields identified as being private in the session activity data;
encrypt the generated session activity data using the encryption key obtained from the client device; and
store the encrypted session activity data.

2. The apparatus of claim 1, wherein the instructions further cause the processor to:
authenticate the client device;
based on the client device being authentic, decrypt the encrypted session activity data using the encryption key obtained from the client device; and
output the decrypted session activity data to the authenticated client device.

3. The apparatus of claim 1, wherein the instructions further cause the processor to:

decrypt the encrypted session activity data using the encryption key used to encrypt the session activity data, the encryption key being based on a symmetric-key algorithm.

4. The apparatus of claim 1, wherein the instructions further cause the processor to:
provide a user interface (UI) at the client device for the proxy session;
authenticate the client device through the UI;
based on the client device being authenticated, allow the encryption key to be uploaded through the UI; and
associate the authenticated client device and the encryption key.

5. The apparatus of claim 1, wherein the instructions further cause the processor to:
obtain a second encryption key from the client device; and
in response to receipt of the second encryption key, replace the encryption key with the second encryption key, wherein the session activity data encrypted using the replaced encryption key is inaccessible after the encryption key is replaced.

6. The apparatus of claim 1, wherein the instructions further cause the processor to:
encrypt the identified private data without encrypting session activity data that is not identified as being private data.

7. The apparatus of claim 1, wherein the instructions further cause the processor to:
receive a request from the client device for the encrypted session activity data;
determine that the client device is authorized to access the encrypted session activity data based on the client device being identified as being associated with the encryption key;
determine that the encryption key is available;
based on a determination that the encryption key is available, decrypt the encrypted session activity data using the encryption key; and
cause the session activity data to be displayed on a user interface (UI).

8. The apparatus of claim 1, wherein the instructions further cause the processor to:
generate the session activity data during management of the proxy session, the generated session activity data being the meta data including the private data; and
encrypt the private data identified in the generated session activity data.

9. A method comprising:
establishing, by a processor at a proxy server, a proxy session between a client device and a server, the proxy session comprising session data based on communication between the client device and the server;
receiving, by the processor, an encryption key from the client device;
generating, by the processor, session activity data based on the session data during the proxy session, the session activity data including meta data that includes information associated with events during the proxy session between the client device and the server;
identifying, by the processor, private data among the meta data, the private data being associated with predetermined fields identified as being private in the session activity data;
encrypting, by the processor, the session activity data using the encryption key received from the client device;

storing, by the processor, the encrypted session activity data;
receiving, by the processor, a request from the client device to access the encrypted session activity data;
based on the client device being authenticated, decrypting, by the processor, the session activity data using the encryption key received from the client device; and
outputting, by the processor, the session activity data to the client device.

10. The method of claim 9, further comprising:
decrypting the encrypted session activity data using the encryption key used to encrypt the session activity data, the encryption key being based on a symmetric-key algorithm.

11. The method of claim 9, further comprising:
providing a user interface (UI) for the proxy session, wherein the encryption key is to be uploaded through the UI;
authenticating the client device through the UI; and
associating the client device and the encryption key based on the client device being authenticated.

12. The method of claim 9, further comprising:
obtaining a second encryption key from the client device; and
in response to receipt of the second encryption key, replacing the encryption key with the second encryption key, wherein the session activity data encrypted using the replaced encryption key is inaccessible after the encryption key is replaced.

13. The method of claim 9, wherein encrypting the generated session activity data comprises:
encrypting the identified private data without encrypting session activity data that is not identified as being private data.

14. The method of claim 9, further comprising:
receiving a request from the client device for the encrypted session activity data;
determining that the client device is authorized to access the encrypted session activity data based on the client device being identified as being associated with the encryption key;
determining that the encryption key is available;
based on a determination that the encryption key is available, decrypting the encrypted session activity data using the encryption key; and
causing the session activity data to be displayed on a user interface (UI).

15. The method of claim 9, wherein encrypting the generated session activity data comprises:
generating the session activity data during management of the proxy session, the generated session activity data including the meta data that includes the private data; and
encrypting the private data identified in the generated session activity data.

16. A computer-readable medium on which is stored computer-readable instructions that, when executed by a processor, cause the processor to:
authenticate, at a proxy server, a client device fora proxy session between the client device and a server, the proxy session comprising session data based on communication between the client device and the server;
based on the client device being authentic,
obtain an encryption key from the client device;
associate the encryption key to the client device;
identify session activity data during a proxy session of the client device, the session activity data including meta data that includes information associated with events during the proxy session between the client device and the server;

identify private data among the session activity data, the private data being associated with predetermined fields identified as being private in the session activity data; and encrypt the session activity data of the proxy session using the encryption key associated with the client device;

receive a request from the client device for the encrypted session activity data;

decrypt the encrypted session activity data using the encryption key associated with the client device; and output the decrypted session activity data.

17. The computer-readable medium of claim 16, wherein the encryption key is based on a symmetric-key algorithm.

18. The computer-readable medium of claim 16, wherein the instructions cause the processor to:

obtain a second encryption key from the client device; and in response to receipt of the second encryption key, replace the encryption key with the second encryption key, wherein the encrypted session activity data encrypted using the replaced encryption key is inaccessible after the encryption key is replaced.

19. The computer-readable medium of claim 16, wherein the instructions cause the processor to:

encrypt the identified private data without encrypting session activity data that is not identified as being private data.

20. The computer-readable medium of claim 16, wherein the instructions cause the processor to:

generate the session activity data during management of the proxy session, the generated session activity data including the meta data that includes the private data; and encrypt the private data identified in the generated session activity data.

* * * * *